US011935716B2

(12) United States Patent
Mori et al.

(10) Patent No.: US 11,935,716 B2
(45) Date of Patent: Mar. 19, 2024

(54) RELAY

(71) Applicant: OMRON Corporation, Kyoto (JP)

(72) Inventors: Shingo Mori, Yamaga (JP); Ryota Minowa, Yamaga (JP); Yasuo Hayashida, Kumamoto (JP); Naoki Kawaguchi, Yame (JP); Kohei Otsuka, Omuta (JP); Hiroyuki Iwasaka, Kumamoto (JP)

(73) Assignee: OMRON CORPORATION, Kyoto (JP)

( * ) Notice: Subject to any disclaimer, the term of this patent is extended or adjusted under 35 U.S.C. 154(b) by 500 days.

(21) Appl. No.: 17/268,597

(22) PCT Filed: Mar. 4, 2019

(86) PCT No.: PCT/JP2019/008419
§ 371 (c)(1),
(2) Date: Feb. 16, 2021

(87) PCT Pub. No.: WO2020/049762
PCT Pub. Date: Mar. 12, 2020

(65) Prior Publication Data

US 2021/0272763 A1 Sep. 2, 2021

(30) Foreign Application Priority Data

Sep. 7, 2018 (JP) ................................ 2018-167627

(51) Int. Cl.
*H01H 50/20* (2006.01)
*H01H 50/44* (2006.01)
*H01H 50/58* (2006.01)

(52) U.S. Cl.
CPC ........... *H01H 50/58* (2013.01); *H01H 50/20* (2013.01); *H01H 50/44* (2013.01)

(58) Field of Classification Search
CPC ........ H01H 50/58; H01H 50/20; H01H 50/44; H01H 50/56; H01H 50/546; H01H 50/645;
(Continued)

(56) References Cited

U.S. PATENT DOCUMENTS 5,631,613 A * 5/1997 Niimi .................. H01H 51/065
335/131
6,020,567 A * 2/2000 Ishikawa ................. H01H 3/28
218/120
(Continued)

FOREIGN PATENT DOCUMENTS

JP 48-5619 Y2 2/1973
JP 2000-11837 A 1/2000
(Continued)

OTHER PUBLICATIONS

The International Search Report of International Application No. PCT/JP2019/008419 dated May 14, 2019.
(Continued)

*Primary Examiner* — William A Bolton
(74) *Attorney, Agent, or Firm* — SHINJYU GLOBAL IP

(57) ABSTRACT

A relay includes a fixed contact, a movable contact piece including a movable contact, a movable portion, a coil, a return spring, and a contact spring. The movable portion includes a drive shaft and a movable iron core. The drive shaft is fixed to the movable contact piece in a contact case and extends from an inside of the contact case to an outside of the contact case. The movable iron core is connected to the drive shaft outside the contact case. The return spring urges the movable portion in an open direction in which the movable contact is separated from the fixed contact. The contact spring urges the drive shaft in a contact direction in
(Continued)

which the movable contact contacts the fixed contact. The contact spring is arranged outside the contact case.

12 Claims, 13 Drawing Sheets

(58) Field of Classification Search
CPC .... H01H 51/287; H01H 51/02; H01H 51/065; H01H 51/12; H01H 51/22; H01H 51/29; H01H 51/27; H01H 51/2254
USPC ...... 200/283, 291, 293, 400; 218/31, 30, 45, 218/48, 67, 80, 110, 107
See application file for complete search history.

(56) References Cited

U.S. PATENT DOCUMENTS

| | | | | |
|---|---|---|---|---|
| 6,360,707 | B1 * | 3/2002 | Boegner | F02N 15/067 335/126 |
| 6,373,675 | B1 * | 4/2002 | Yamazaki | H01H 33/6662 218/120 |
| 7,549,899 | B2 * | 6/2009 | Imanishi | H01H 51/065 439/877 |
| 8,179,217 | B2 * | 5/2012 | Kawaguchi | H01H 51/2209 335/85 |
| 8,766,750 | B2 * | 7/2014 | Choi | H01H 51/065 335/181 |
| 9,053,879 | B2 * | 6/2015 | Lammers | H01H 53/015 |
| 9,512,361 | B2 * | 12/2016 | Nezu | C09K 19/3809 |
| 9,673,008 | B2 * | 6/2017 | Tachikawa | H01H 50/58 |
| 9,715,984 | B2 * | 7/2017 | Guo | H01H 50/02 |
| 9,852,865 | B2 * | 12/2017 | Kroeker | H01H 50/22 |
| 2008/0007373 | A1 * | 1/2008 | Andoh | H01H 50/20 335/38 |
| 2014/0014622 | A1 | 1/2014 | Naka et al. | |
| 2015/0371748 | A1 | 12/2015 | Kim | |

FOREIGN PATENT DOCUMENTS

| | | | |
|---|---|---|---|
| JP | 5727862 | B2 | 6/2015 |
| WO | 2014141901 | A1 | 9/2014 |

OTHER PUBLICATIONS

The Written Opinion of the International Searching Authority of International Application No. PCT/JP2019/008419 dated May 14, 2019.

* cited by examiner

RELAY

CROSS-REFERENCE TO RELATED APPLICATION

This application is the U.S. National Phase of International Application No. PCT/JP2019/008419, filed on Mar. 4, 2019. This application claims priority to Japanese Patent Application No. 2018-167627, filed Sep. 7, 2018. The contents of those applications are incorporated by reference herein in their entireties.

FIELD

The present invention relates to a relay.

BACKGROUND

There is a type of relay that has an internal space partitioned by a contact case. For example, in Japanese Patent Publication No. JP5727862B2, a fixed contact, a movable contact, and a movable contact piece are arranged in the contact case. Further, a coil and a movable iron core are arranged outside the contact case.

The movable contact piece is connected to a drive shaft in the contact case via a holder and a contact spring. The contact spring urges the movable contact piece in a direction in which the movable contact is pressed against the fixed contact while the movable contact is in contact with the fixed contact. The drive shaft extends from the inside of the contact case to the outside of the contact case. The movable iron core is connected to the drive shaft. The coil moves the drive shaft by moving the movable iron core by magnetic force. As a result, the movable contact piece moves in the direction in which the movable contact contacts the fixed contact and in the direction in which the movable contact are separated from the fixed contact.

SUMMARY

In the relay described above, as the drive shaft moves, movable parts such as the movable contact piece, the drive shaft, the holder, and the contact spring slide with each other. These movable parts are arranged in the contact case together with the movable contact and the fixed contact. Therefore, when abrasion powder is generated due to the sliding of the movable parts, the abrasion powder easily adheres to the movable contact or the fixed contact. When the abrasion powder adheres to the movable contact or the fixed contact, the contact resistance at the contacts increases, which makes it difficult to improve the energization capacity.

An object of the present invention is to suppress an increase in contact resistance due to abrasion powder of moving parts in a relay.

A relay according to one aspect includes a fixed contact, a movable contact piece, a contact case, a movable portion, a coil, a return spring, and a contact spring. The movable contact piece includes a movable contact arranged so as to face the fixed contact. The contact case houses the fixed contact and the movable contact piece. The movable portion is configured to move in a direction in which the movable contact contacts the fixed contact and in a direction in which the movable contact is separated from the fixed contact. The movable portion includes a drive shaft and a movable iron core. The drive shaft is fixed to the movable contact piece in the contact case and extends from an inside of the contact case to an outside of the contact case. The movable iron core is connected to the drive shaft outside the contact case. The coil generates a magnetic force that moves the movable iron core in a moving direction of the moving portion. The return spring urges the movable portion in the direction in which the movable contact is separated from the fixed contact. The contact spring urges the drive shaft in the direction in which the movable contact contacts the fixed contact. The contact spring is arranged outside the contact case.

In the relay according to the present aspect, the contact spring is arranged outside the contact case. Therefore, even if the contact spring and movable parts around the contact spring slide with each other to generate abrasion powder, it is possible to prevent the abrasion powder from adhering to the movable contact or the fixed contact. As a result, it is possible to suppress an increase in contact resistance due to abrasion powder.

The drive shaft may be immovably fixed to the movable contact piece in an axial direction of the drive shaft. In this case, abrasion powder is unlikely to be generated between the drive shaft and the movable contact piece. Therefore, it is possible to prevent the abrasion powder from adhering to the movable contact or the fixed contact. As a result, it is possible to suppress an increase in contact resistance due to abrasion powder.

The relay may further include a spool. The coil may be wound around the spool. The spool may be arranged outside the contact case. The spool may include a hole extending in the moving direction of the movable portion. The contact spring may be located in the hole of the spool. In this case, the contact spring and the spool can be compactly arranged outside the contact case.

The relay may further include a fixed iron core facing the movable iron core. The fixed iron core may include an internal space extending in the moving direction of the movable portion. The contact spring may be arranged in the internal space of the fixed iron core. In this case, the contact spring and the fixed iron core can be compactly arranged outside the contact case.

Both the contact spring and the return spring may be arranged in the internal space of the fixed iron core. In this case, the contact spring, the return spring, and the fixed iron core can be compactly arranged outside the contact case.

The contact spring may be arranged in the internal space of the fixed iron core. The return spring may be arranged radially outside the fixed iron core. In this case, the contact spring, the return spring, and the fixed iron core can be compactly arranged outside the contact case.

The movable iron core may include an internal space extending in the moving direction of the movable portion. A part of the drive shaft may be arranged in the internal space of the movable iron core. The contact spring may be arranged in the internal space of the movable iron core. In this case, the contact spring and the movable iron core can be compactly arranged outside the contact case.

Both the contact spring and the return spring may be arranged in the internal space of the movable iron core. In this case, the contact spring, the return spring, and the movable iron core can be compactly arranged outside the contact case.

The fixed iron core may include a first internal space extending in the moving direction of the movable portion. The movable iron core may include a second internal space that extends in the moving direction of the movable portion and faces the first internal space. The contact spring may be arranged in the first internal space. The return spring may be arranged over the first internal space and the second internal space. In this case, the contact spring, the return spring, the fixed iron core, and the movable iron core can be compactly arranged outside the contact case.

The movable iron core may include a hole extending through the movable iron core in the moving direction of the movable portion. The drive shaft may be inserted into the hole of the movable iron core and configured to move in the moving direction of the movable portion with respect to the movable iron core. In this case, as the drive shaft moves, the drive shaft slides with respect to an inner surface of the hole of the movable iron core. However, since the movable iron core is arranged outside the contact case, even if abrasion powder is generated from the drive shaft and the movable iron core, it is possible to prevent the abrasion powder from adhering to the movable contact or the fixed contact. As a result, it is possible to suppress an increase in contact resistance due to abrasion powder.

The relay may further include a stopper. The stopper may restrict a movement of the movable iron core with respect to the drive shaft when the movable portion moves in the direction in which the movable contact is separated from the fixed contact. The stopper may be arranged outside the contact case. In this case, the stopper restricts the movement of the drive shaft with respect to the movable iron core, so that the drive shaft moves together with the movable iron core. Further, even if the stopper and the movable iron core or the drive shaft slide with each other to generate abrasion powder, it is possible to prevent the abrasion powder from adhering to the movable contact or the fixed contact. As a result, it is possible to suppress an increase in contact resistance due to abrasion powder.

The drive shaft and the hole of the movable iron core may have a polygonal shape. In this case, the drive shaft is prevented from rotating with respect to the movable iron core. Further, by sliding the drive shaft and the hole of the movable iron core, even if abrasion powder is generated, it is possible to prevent the abrasion powder from adhering to the movable contact or the fixed contact. As a result, it is possible to suppress an increase in contact resistance due to abrasion powder.

DETAILED DESCRIPTION

Figure 1:
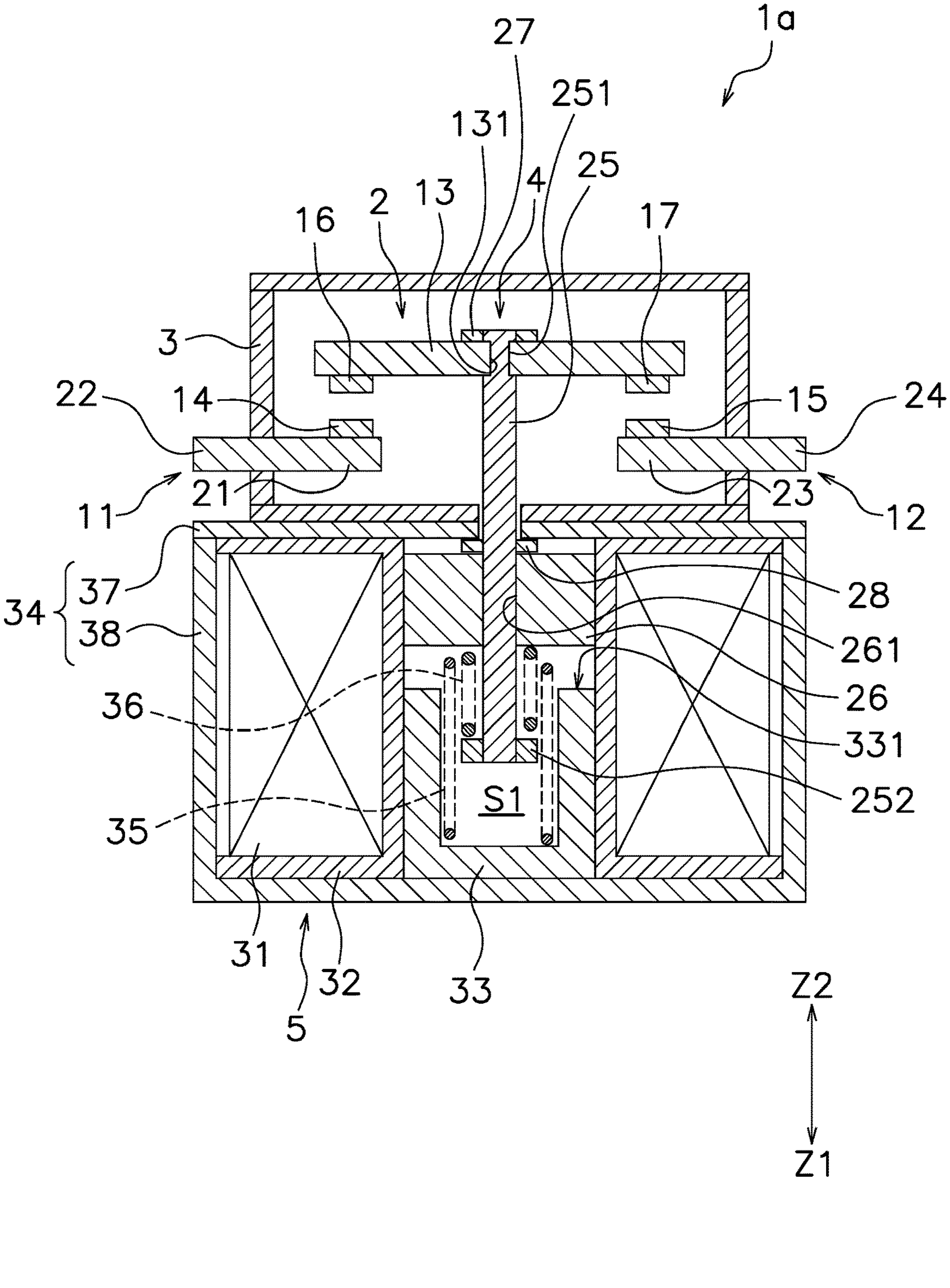
FIG. 1 is a side sectional view showing a relay according to a first embodiment.

Hereinafter, a relay according to an embodiment will be described with reference to the drawings. FIG. 1 is a side sectional view showing a relay 1*a* according to a first embodiment. As illustrated in FIG. 1, the relay 1*a* includes a contact device 2, a contact case 3, a movable portion 4, and a coil block 5. In the following description, each direction of up/down/left/right means each direction of up/down/left/right in FIG. 1. Specifically, a direction from the coil block 5 toward the contact case 3 is defined as upward. Further, a direction from the contact case 3 toward the coil block 5 is defined as downward. However, these directions are defined for convenience of explanation, and do not limit the arrangement direction of the relay 1*a*.

The contact device 2 includes a first fixed terminal 11, a second fixed terminal 12, and a movable contact piece 13. The first fixed terminal 11, the second fixed terminal 12, and the movable contact piece 13 are made of conductive material such as copper. The first fixed terminal 11 includes a first fixed contact 14. The second fixed terminal 12 includes a second fixed contact 15. The first fixed contact 14 and the second fixed contact 15 are arranged apart from each other in the left-right direction.

The movable contact piece 13 extends in the left-right direction. In the present embodiment, the longitudinal direction of the movable contact piece 13 coincides with the left-right direction. The movable contact piece 13 is arranged above the first fixed contact 14 and the second fixed contact 15. The movable contact piece 13 includes a first movable contact 16 and a second movable contact 17. The first movable contact 16 and the second movable contact 17 are arranged apart from each other in the left-right direction. The first movable contact 16 is arranged so as to face the first fixed contact 14. The second movable contact 17 is arranged so as to face the second fixed contact 15.

The movable contact piece 13 is arranged so as to be movable in the vertical direction. Specifically, the movable contact piece 13 is movably arranged in a contact direction Z1 and an open direction Z2. In the present embodiment, the contact direction Z1 is a direction in which the first movable contact 16 and the second movable contact 17 come into contact with the first fixed contact 14 and the second fixed contact 15 (lower side in FIG. 1). The open direction Z2 is a direction in which the first movable contact 16 and the second movable contact 17 are separated from the first fixed contact 14 and the second fixed contact 15 (upper side in FIG. 1).

The contact case 3 houses the contact device 2. Specifically, the contact case 3 houses the first fixed contact 14, the second fixed contact 15, and the movable contact piece 13. The contact case 3 is made of insulating material.

The first fixed terminal 11 includes a first contact support portion 21 and a first external terminal portion 22. The first contact support portion 21 is connected to the first fixed contact 14. The first contact support portion 21 is arranged in the contact case 3. The first external terminal portion 22 is connected to the first contact support portion 21. The first external terminal portion 22 projects outward from the contact case 3. The second fixed terminal 12 includes a second contact support portion 23 and a second external terminal portion 24. The second contact support portion 23 is connected to the second fixed contact 15. The second contact support portion 23 is arranged in the contact case 3. The second external terminal portion 24 is connected to the second contact support portion 23. The second external terminal portion 24 projects outward from the contact case 3.

In FIG. 1, the first external terminal portion 22 and the second external terminal portion 24 project from the contact case 3 in the left-right direction. However, the first external terminal portion 22 and the second external terminal portion 24 may project from the contact case 3 not only in the left-right direction but also in other directions such as the up-down direction.

The movable portion 4 is movably arranged in the contact direction Z1 and the open direction Z2. The movable portion 4 includes a drive shaft 25 and a movable iron core 26. The drive shaft 25 extends in the vertical direction. The drive shaft 25 extends from the inside of the contact case 3 to the outside of the contact case 3. The drive shaft is movably arranged in the contact direction Z1 and the open direction Z2. The drive shaft 25 is fixed to the movable contact piece 13 in the contact case 3.

Specifically, the drive shaft 25 includes a contact piece fixing portion 251. The contact piece fixing portion 251 is fixed to the movable contact piece 13. The contact piece fixing portion 251 is located in the contact case 3. The drive shaft 25 is immovably fixed to the movable contact piece 13 in the axial direction of the drive shaft 25 at the contact piece fixing portion 251. Specifically, the drive shaft 25 is fixed to the movable contact piece 13 by a stopper 27 that is separate from the drive shaft 25. However, the stopper 27 may be omitted. For example, the drive shaft 25 may be fixed to the movable contact piece 13 by locking the contact piece fixing portion 251 to the movable contact piece 13. Alternatively, the contact piece fixing portion 251 may be fixed to the movable contact piece 13 by a fixing means such as welding.

The movable iron core 26 is arranged outside the contact case 3. The movable iron core 26 is connected to the drive shaft 25 outside the contact case 3. The movable iron core 26 is movably arranged in the contact direction Z1 and the open direction Z2. The movable iron core 26 is arranged below the contact case 3. The movable iron core 26 has a cylindrical outer shape. The movable iron core 26 includes a hole 261 that extends through the movable iron core 26 in the vertical direction. The drive shaft 25 is inserted into the hole 261 of the movable iron core 26. The drive shaft 25 is configured to move in the vertical direction with respect to the movable iron core 26.

A stopper 28 is attached to the drive shaft 25. The stopper 28 projects from the outer peripheral surface of the drive shaft 25. The stopper 28 is arranged outside the contact case 3. The stopper 28 is arranged between the contact case 3 and the movable iron core 26 in the vertical direction. The stopper 28 is arranged above the movable iron core 26. The stopper 28 regulates the movement of the movable iron core 26 with respect to the drive shaft 25 when the movable portion 4 moves upward, that is, in the open direction Z2.

The coil block 5 operates the movable contact piece 13 by an electromagnetic force. The coil block 5 moves the movable contact piece 13 in the contact direction Z1 and the open direction Z2. The coil block 5 is arranged outside the contact case 3. The coil block 5 is arranged below the contact case 3. The relay 1*a* may include a housing for accommodating the coil block 5. Alternatively, the coil block 5 and the contact case 3 may be housed in the housing. In that case, the contact case 3 may be divided into a space for accommodating the contact device 2 and a space for accommodating the coil block in the housing.

The coil block 5 includes a coil 31, a spool 32, a fixed iron core 33, a yoke 34, a return spring 35, and a contact spring 36. The coil 31 is wound around the spool 32. The coil 31 and the spool 32 are arranged coaxially with the drive shaft 25. The coil 31 generates an electromagnetic force that moves the movable iron core 26 in the contact direction Z1 and the open direction Z2. The spool 32 includes a hole 321 that extends through the spool 32 in the vertical direction. The movable iron core 26, the fixed iron core 33, the return spring 35, and the contact spring 36 are arranged in the hole 321 of the spool 32.

The yoke 34 is connected to the fixed iron core 33. The yoke 34 includes a first yoke 37 and a second yoke 38. The first yoke 37 is arranged above the coil 31. The first yoke 37 is arranged between the contact case 3 and the spool 32. The second yoke 38 is connected to the first yoke 37. The second yoke 38 has a U-shape. The second yoke 38 is arranged on both lateral sides of the coil 31 and below the coil 31.

The fixed iron core 33 is in contact with the second yoke 38. The movable iron core 26 is provided separately from the fixed iron core 33. The fixed iron core 33 is arranged in the hole 321 of the spool 32. The fixed iron core 33 has a cylindrical outer shape. The fixed iron core 33 faces the movable iron core 26. The fixed iron core 33 is arranged below the movable iron core 26. The fixed iron core 33 includes an internal space S1. The internal space S1 extends in the vertical direction. The internal space S1 is open on the upper surface 331 of the fixed iron core 33. The internal space S1 extends downward from the upper surface 331 of the fixed iron core 33.

The return spring 35 is arranged between the movable iron core 26 and the fixed iron core 33. In the present embodiment, the return spring 35 is a coil spring. An upper end of the return spring 35 is in contact with the movable iron core 26, and a lower end of the return spring 35 is in contact with the fixed iron core 33. The return spring 35 urges the movable iron core 26 in the open direction Z2. The return spring 35 is arranged in the internal space of the fixed iron core 33.

The contact spring 36 is connected to the drive shaft 25 and the movable iron core 26. In the present embodiment, the contact spring 36 is a coil spring. A part of the drive shaft 25 is arranged in the contact spring 36. Specifically, the drive shaft 25 includes a spring support portion 252. The spring support portion 252 has a flanged shape protruding radially outward from the outer peripheral surface of the drive shaft 25. The contact spring 36 is arranged between the spring support portion 252 and the movable iron core 26 in the vertical direction. The contact spring 36 is arranged above the spring support portion 252 and below the movable iron core 26.

The spring support portion 252 and the contact spring 36 are arranged in the internal space S1 of the fixed iron core 33. An outer diameter of the spring support portion 252 and an outer diameter of the contact spring 36 are smaller than an inner diameter of the return spring 35. The spring support portion 252 and the contact spring 36 are arranged in the return spring 35. The contact spring 36 urges the drive shaft 25 in the contact direction Z1 in a state where the movable contacts 16 and 17 are in contact with the fixed contacts 22 and 23.

Next, the operation of the relay 1*a* will be described. When no current is passed through the coil 31 so that the coil 31 is not magnetized, the drive shaft 25 is pressed in the open direction Z2 by the elastic force of the return spring 35 together with the movable iron core 26. Therefore, the movable contact piece 13 is also pressed in the open direction Z2, and as illustrated in FIG. 1, the first movable contact 16 and the second movable contact 17 are in an open state in which the first movable contact 16 and the second movable contact 17 are separated from the first fixed contact 14 and the second fixed contact 15.

When a current is passed through the coil 31 so that the coil 31 is magnetized, the movable iron core 26 moves in the contact direction Z1 against the elastic force of the return spring 35 due to the electromagnetic force of the coil 31. As a result, the drive shaft 25 and the movable contact piece 13 both move in the contact direction Z1, and as illustrated in FIG. 2A, the first movable contact 16 and the second movable contact 17 contact the first fixed contact 14 and the second fixed contact 15 respectively.

Figure 2A:
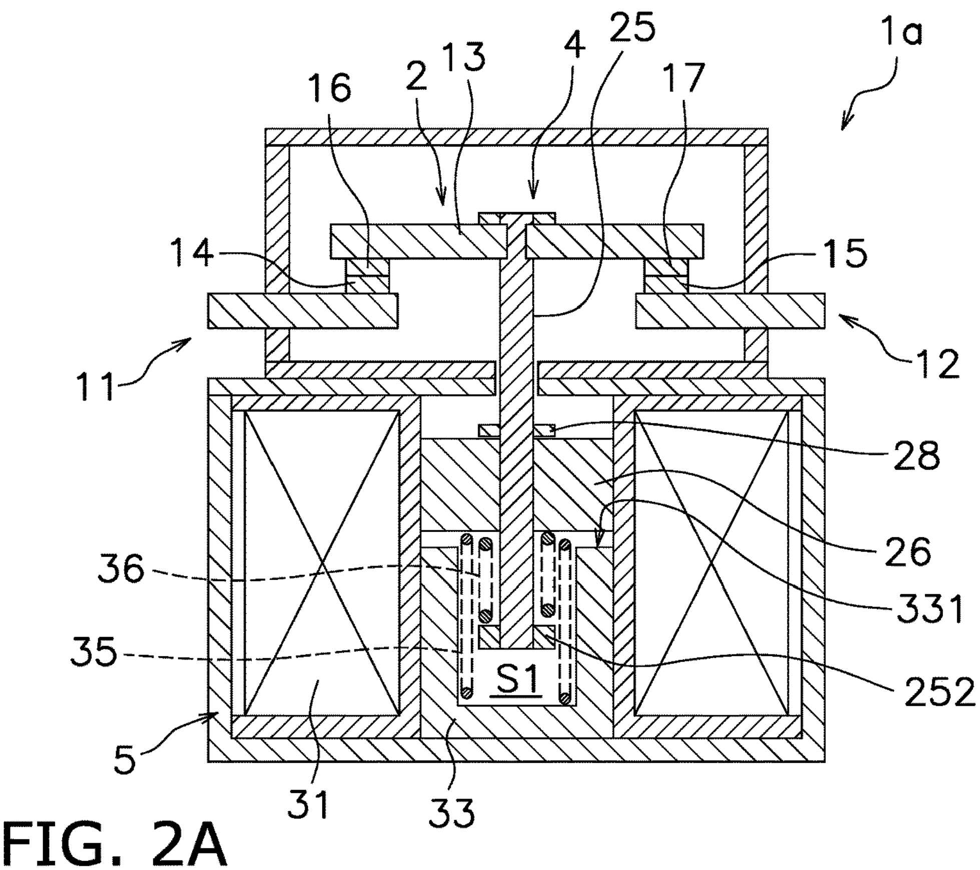
FIGS. 2A and 2B are side sectional views showing a relay according to the first embodiment.
Figure 2B:
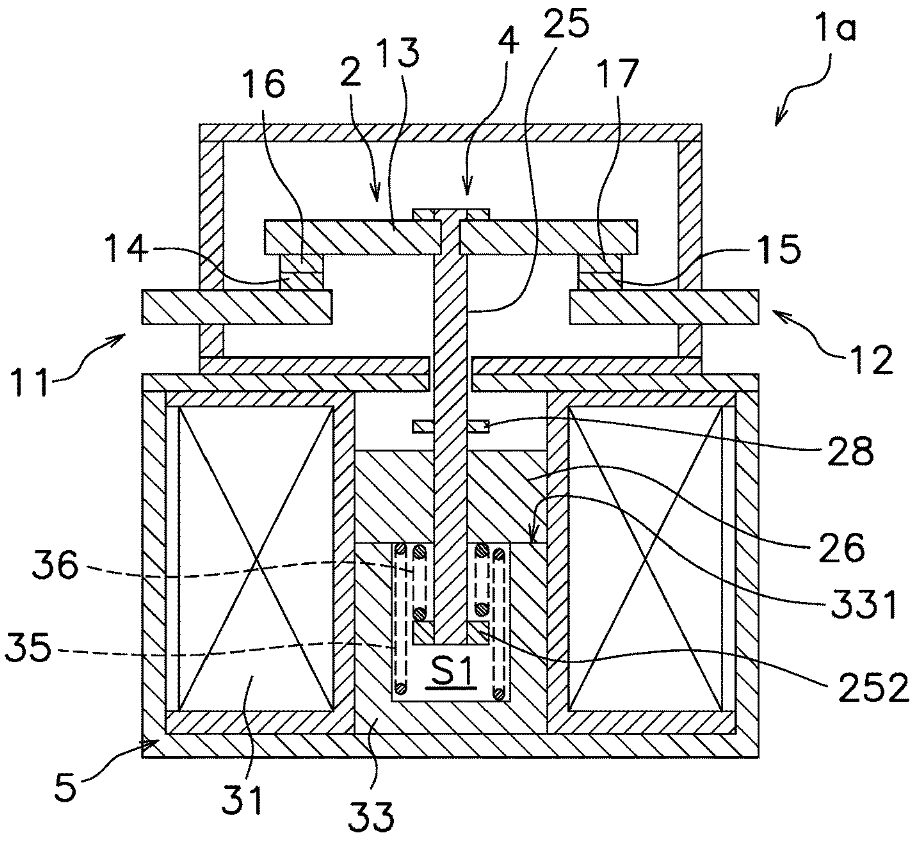

Due to the electromagnetic force of the coil 31, the movable iron core 26 further moves from the position illustrated in FIG. 2A in the contact direction Z1. Then, as illustrated in FIG. 2B, the movable iron core 26 is restricted from moving downward by contacting the fixed iron core 33. As a result, the first movable contact 16 and the second movable contact 17 are in a closed state in which the first movable contact 16 and the second movable contact 17 contact the first fixed contact 14 and the second fixed contact 15.

In the state illustrated in FIG. 2A, since the first movable contact 16 and the second movable contact 17 are in contact with the first fixed contact 14 and the second fixed contact 15, respectively, the drive shaft 25 is restricted from moving downward. Therefore, when the movable iron core 26 further moves in the contact direction Z1 due to the electromagnetic force of the coil 31, the movable iron core 26 moves in the contact direction Z1 with respect to the drive shaft 25. As a result, the contact spring 36 is compressed between the movable iron core 26 and the spring support portion 252. Therefore, in the closed state illustrated in FIG. 2B, the contact spring 36 urges the drive shaft 25 in the contact direction Z1. As a result, sufficient contact force is ensured.

When the current to the coil 31 is stopped so that the coil 31 is demagnetized, the movable iron core 26 is pressed in the open direction Z2 by the elastic force of the return spring 35. As a result, the movable iron core 26 moves in the open direction Z2 with respect to the drive shaft 25. When the movable iron core 26 moves to a position where the movable iron core 26 contacts the stopper 28, the movement of the movable iron core 26 with respect to the drive shaft 25 in the open direction Z2 is restricted by the stopper 28. Therefore, the drive shaft 25 moves in the open direction Z2 together with the movable iron core 26, and the movable contact piece 13 also moves in the open direction Z2. As a result, the first movable contact 16 and the second movable contact 17 return to the open state.

In the relay 1*a* according to the present embodiment described above, the contact spring 36 is arranged outside the contact case 3. Therefore, even if the contact spring 36 and the drive shaft 25 or the contact spring 36 and the movable iron core 26 slide with each other to generate abrasion powder, it is possible to prevent the abrasion powder from adhering to the movable contacts 16 and 17 or the fixed contacts 14 and 15.

The drive shaft 25 is inserted into the hole 261 of the movable iron core 26, and the drive shaft 25 can move in the vertical direction with respect to the movable iron core 26 at a position other than the position where the drive shaft 25 contacts the stopper 28. However, the movable iron core 26 is arranged outside the contact case 3. Therefore, even if the abrasion powder is generated between the movable iron core 26 and the drive shaft 25, it is possible to prevent the abrasion powder from adhering to the movable contacts 16 and 17 or the fixed contacts 14 and 15.

The stopper 28 that restricts the movement of the drive shaft 25 with respect to the movable iron core 26 is arranged outside the contact case 3. Therefore, even if the stopper 28 and the movable iron core 26 slide with each other to generate abrasion powder, it is possible to prevent the abrasion powder from adhering to the movable contacts 16 and 17 or the fixed contacts 14 and 15.

The drive shaft 25 is fixed to the movable contact piece 13 so as not to move in the vertical direction. Therefore, abrasion powder is unlikely to be generated between the drive shaft 25 and the movable contact piece 13. Therefore, it is possible to prevent the abrasion powder from adhering to the movable contacts 16 and 17 or the fixed contacts 14 and 15.

As described above, in the relay 1*a* according to the present embodiment, the parts such as the contact spring 36 that slides with the movement of the movable portion 4 are not arranged in the contact case 3, and arranged with the coil block 5 outside the contact case 3. Therefore, even if abrasion powder is generated between the movable iron core 26 and the drive shaft 25, it is possible to prevent the abrasion powder from adhering to the movable contacts 16 and 17 or the fixed contacts 14 and 15. As a result, it is possible to suppress an increase in contact resistance due to abrasion powder.

Further, in the relay 1*a* according to the present embodiment, both the contact spring 36 and the return spring 35 are arranged in the internal space S1 of the fixed iron core 33. Therefore, the contact spring 36 and the return spring 35 can be compactly arranged outside the contact case 3.

Figure 3:
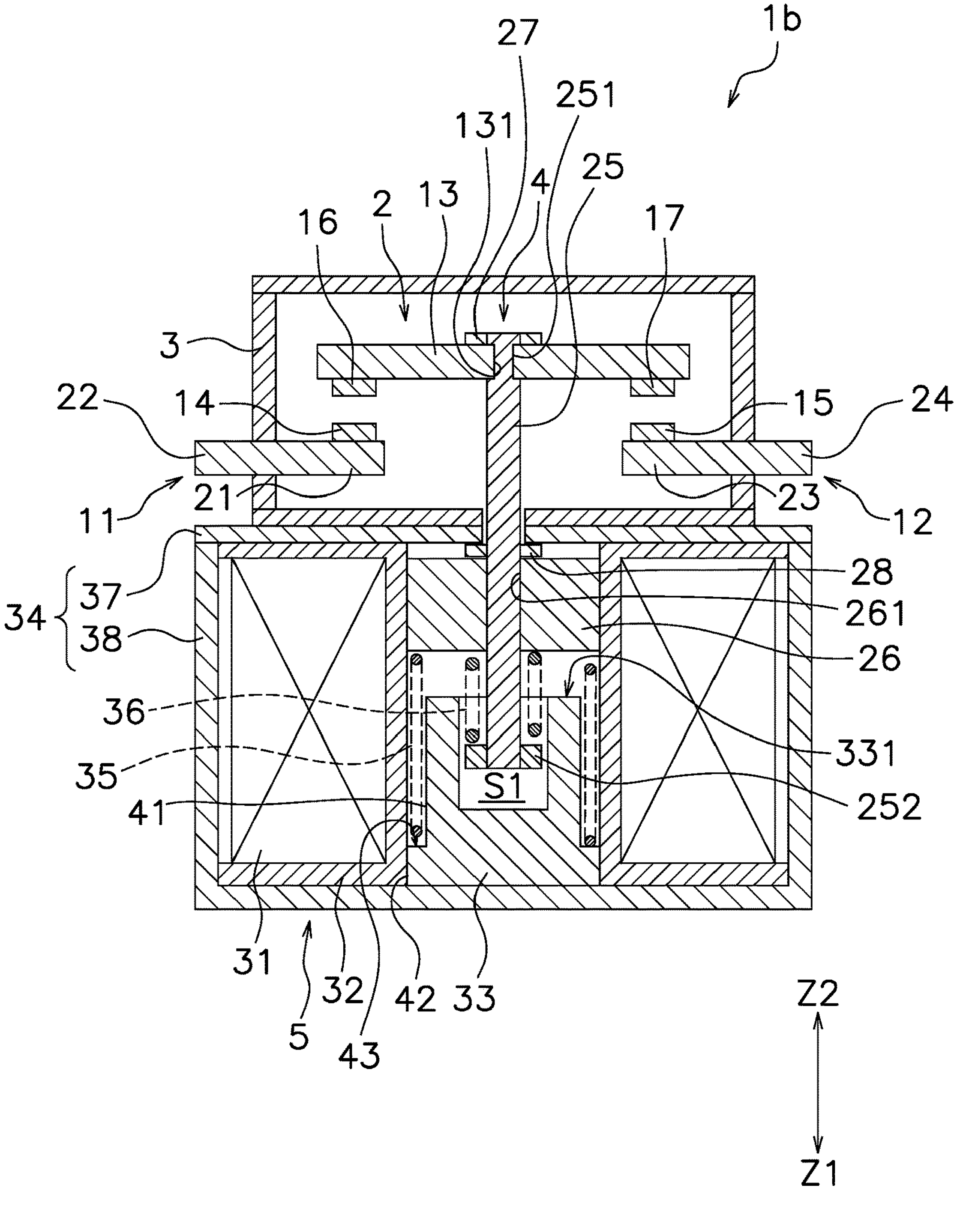
FIG. 3 is a side sectional view showing the relay according to a second embodiment.
Figure 4:
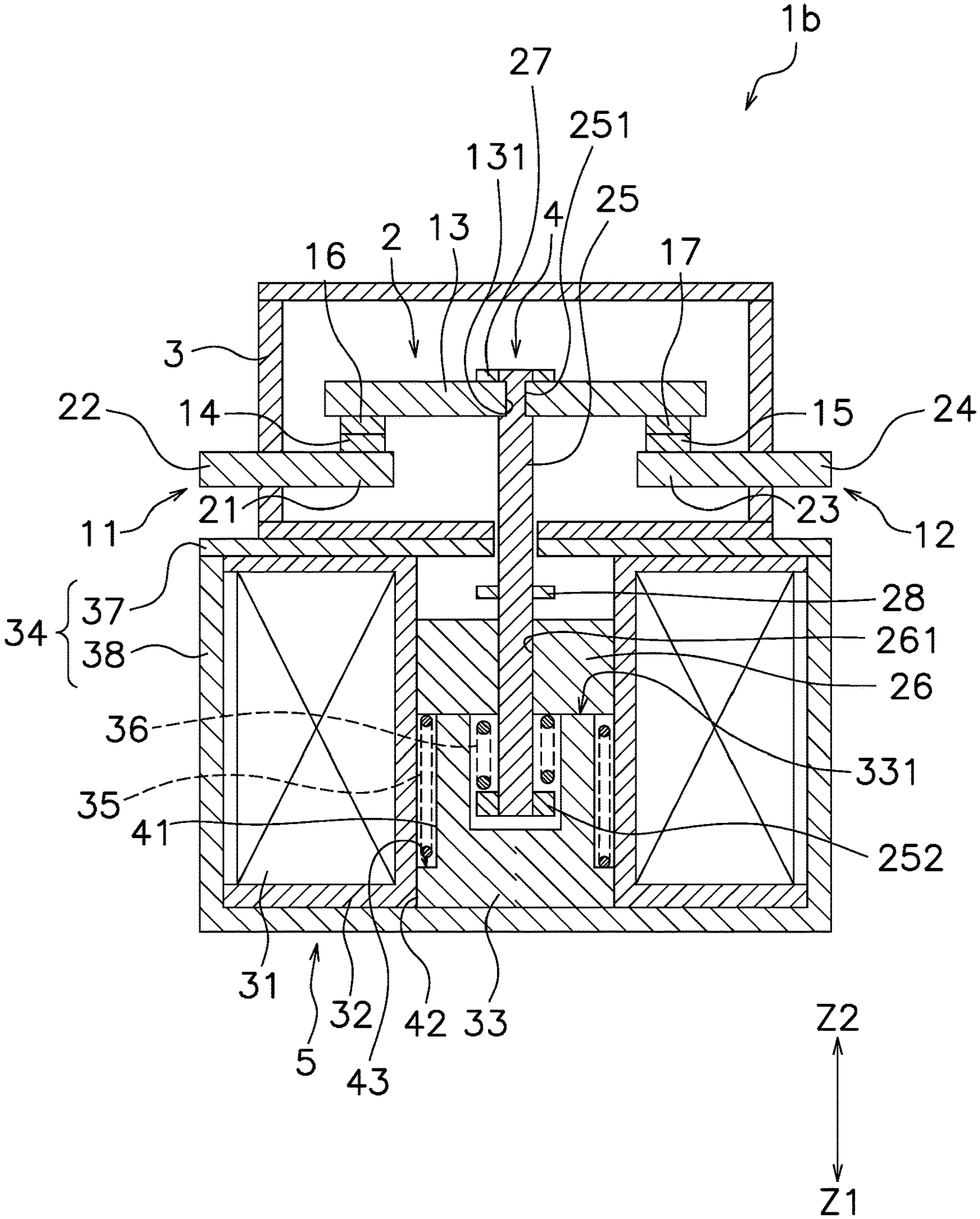
FIG. 4 is a side sectional view showing the relay according to the second embodiment.

Next, a relay 1*b* according to a second embodiment will be described. FIGS. 3 and 4 are side sectional views of the relay 1*b* according to the second embodiment. FIG. 3 shows the relay 1*b* in the open state. FIG. 4 shows the relay 1*b* in the closed state. As illustrated in FIGS. 3 and 4, in the relay 1*b* according to the second embodiment, the contact spring 36 is arranged in the internal space S1 of the fixed iron core 33. The inner diameter of the return spring 35 is larger than the outer diameter of the fixed iron core 33. The return spring 35 is arranged radially outward of the fixed iron core 33.

Specifically, the fixed iron core 33 includes a first cylinder portion 41 and a second cylinder portion 42. The second cylinder portion 42 is arranged below the first cylinder portion 41. An outer diameter of the first cylinder portion 41 is smaller than an outer diameter of the second cylinder portion 42. An inner diameter of the return spring 35 is larger than an outer diameter of the first cylinder portion 41. The return spring 35 is arranged radially outward of the first cylinder portion 41. A step portion 43 is provided between the first cylinder portion 41 and the second cylinder portion 42. An upper end of the return spring 35 is in contact with the movable iron core 26. A lower end of the return spring 35 is in contact with the fixed iron core 33 at the step portion 43. Other configurations of the relay 1*b* according to the second embodiment are the same as those of the relay 1*a* according to the first embodiment. The relay 1*b* according to the second embodiment can also obtain the same effects as the relay 1*a* according to the first embodiment.

Figure 5:
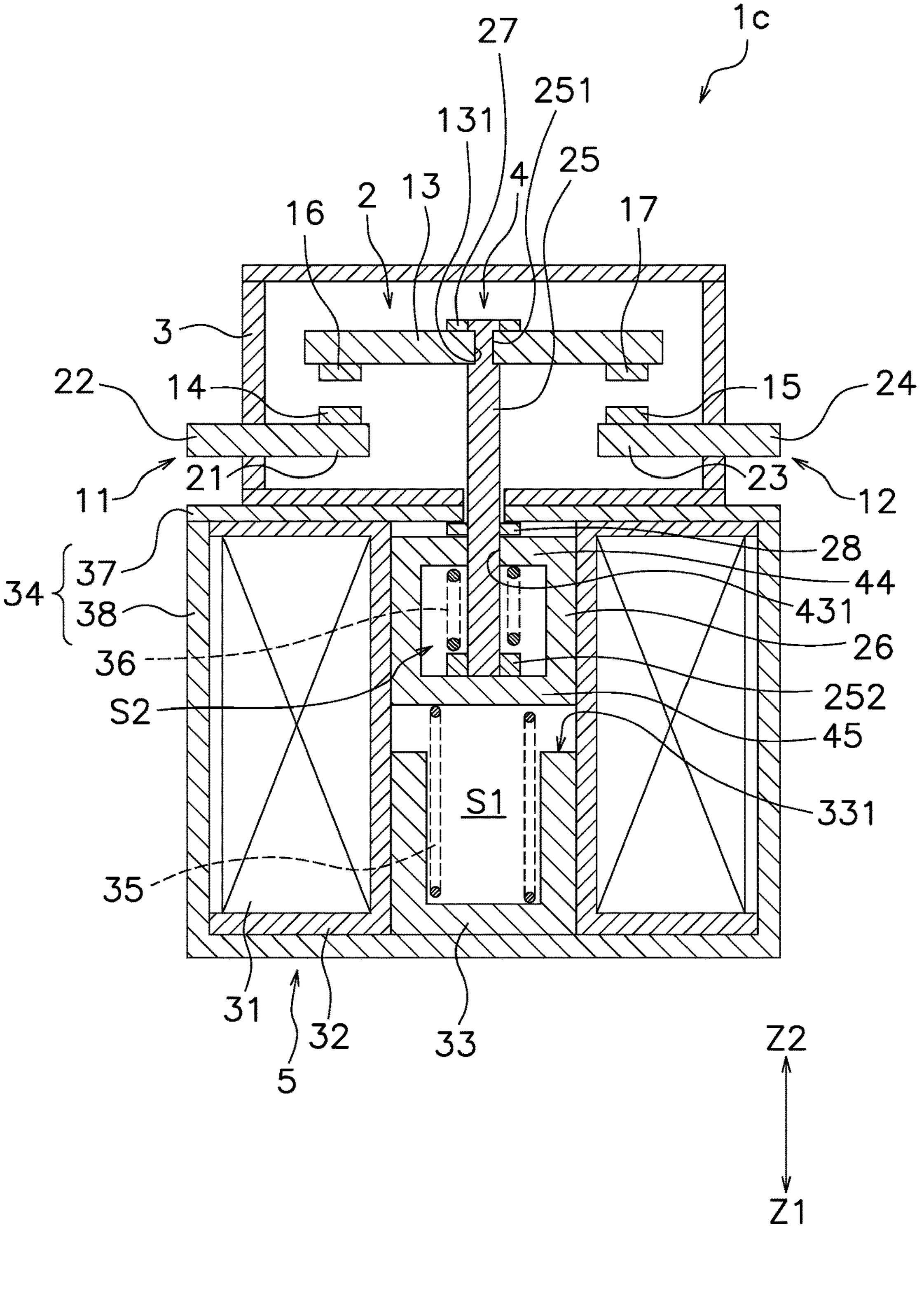
FIG. 5 is a side sectional view showing the relay according to a third embodiment.
Figure 6:
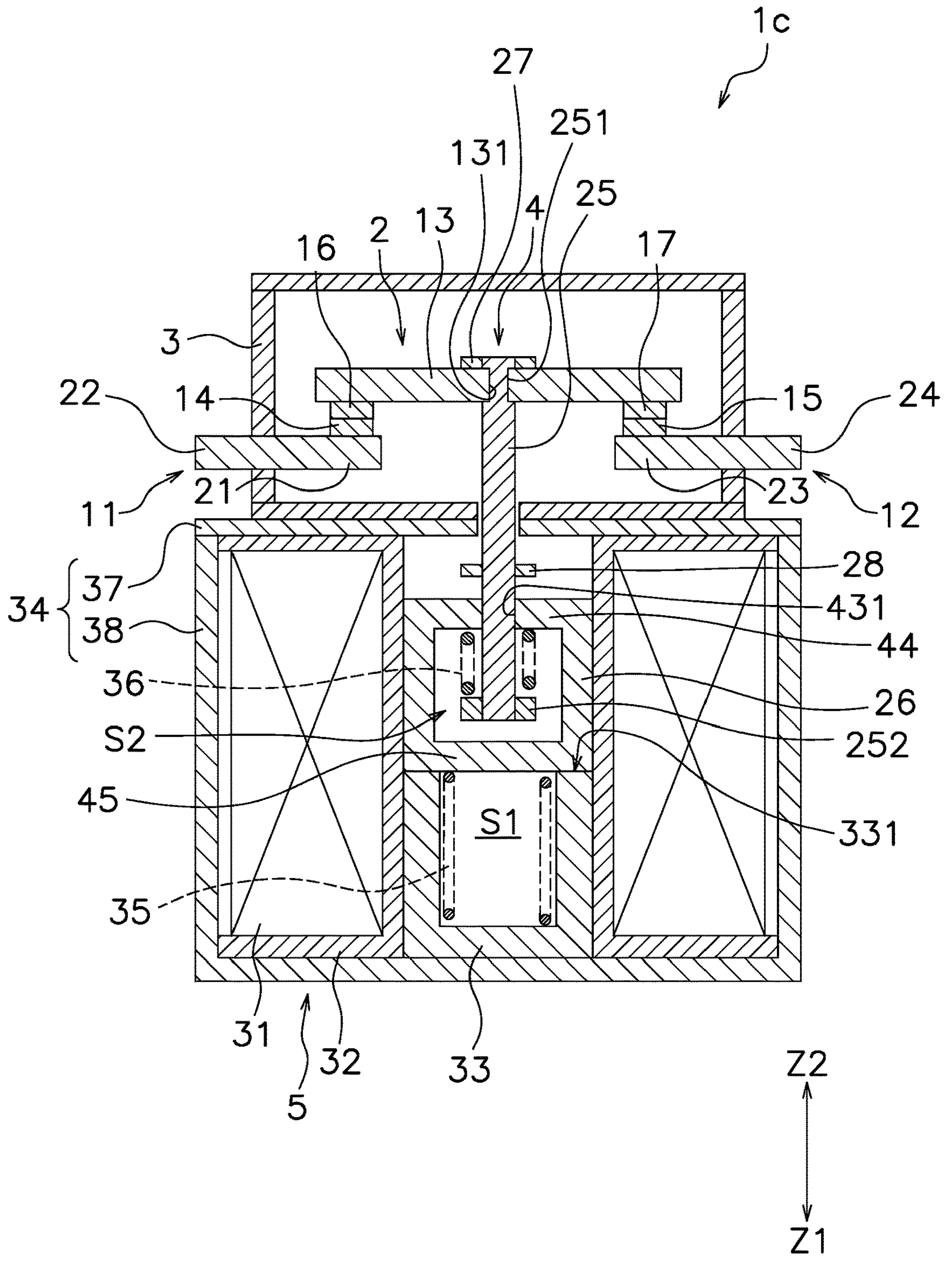
FIG. 6 is a side sectional view showing the relay according to the third embodiment.

Next, a relay 1*c* according to a third embodiment will be described. FIGS. 5 and 6 are side sectional views of the relay 1*c* according to the third embodiment. FIG. 5 shows the relay 1*c* in the open state. FIG. 6 shows the relay 1*c* in the closed state. As illustrated in FIGS. 5 and 6, in the relay 1*c* according to the third embodiment, the movable iron core 26 includes an internal space S2 extending in the moving direction of the movable portion 4. A part of the drive shaft 25 is arranged in the internal space S2 of the movable iron core 26. The contact spring 36 is arranged in the internal space S2 of the movable iron core 26. The return spring 35 is arranged in the internal space S1 of the fixed iron core 33.

Specifically, the movable iron core 26 includes an upper wall 44 and a lower wall 45. The upper wall 44 is arranged above the internal space S2. The upper wall 44 includes a hole 431 into which the drive shaft 25 is inserted. The spring support portion 252 of the drive shaft 25 is arranged in the internal space S2 of the movable iron core 26 together with the contact spring 36. The contact spring 36 is arranged between the upper wall 44 of the movable iron core 26 and the spring support portion 252 in the vertical direction.

The lower wall 45 is arranged below the internal space. The lower wall 45 faces the fixed iron core 33. The upper end of the return spring 35 is in contact with the lower wall 45 of the movable iron core 26. The lower wall 45 may be omitted, and the internal space S2 may be opened on the lower surface of the movable iron core 26. Other configurations of the relay 1*c* according to the third embodiment are the same as those of the relay 1*a* according to the first embodiment. The relay 1*c* according to the third embodiment can also obtain the same effects as the relay 1*a* according to the first embodiment.

In the relays 1*a* to 1*c* according to the first to third embodiments described above, the coil block 5 pulls the drive shaft 25 downward, that is, toward the coil block 5, so that the movable contact piece 13 moves in the contact direction Z1 (Hereinafter referred to as "pull-type structure"). However, the operating direction of the drive shaft for opening and closing the contacts may be opposite to that of the above embodiment. That is, the coil block 5 may have a structure (hereinafter, referred to as "push-type structure") in which the movable contact piece 13 moves in the contact direction Z1 by pushing the drive shaft 25 upward, that is, toward the contact device 2. That is, the contact direction Z1 and the open direction Z2 may be upside down from the above-described embodiment.

Figure 7:
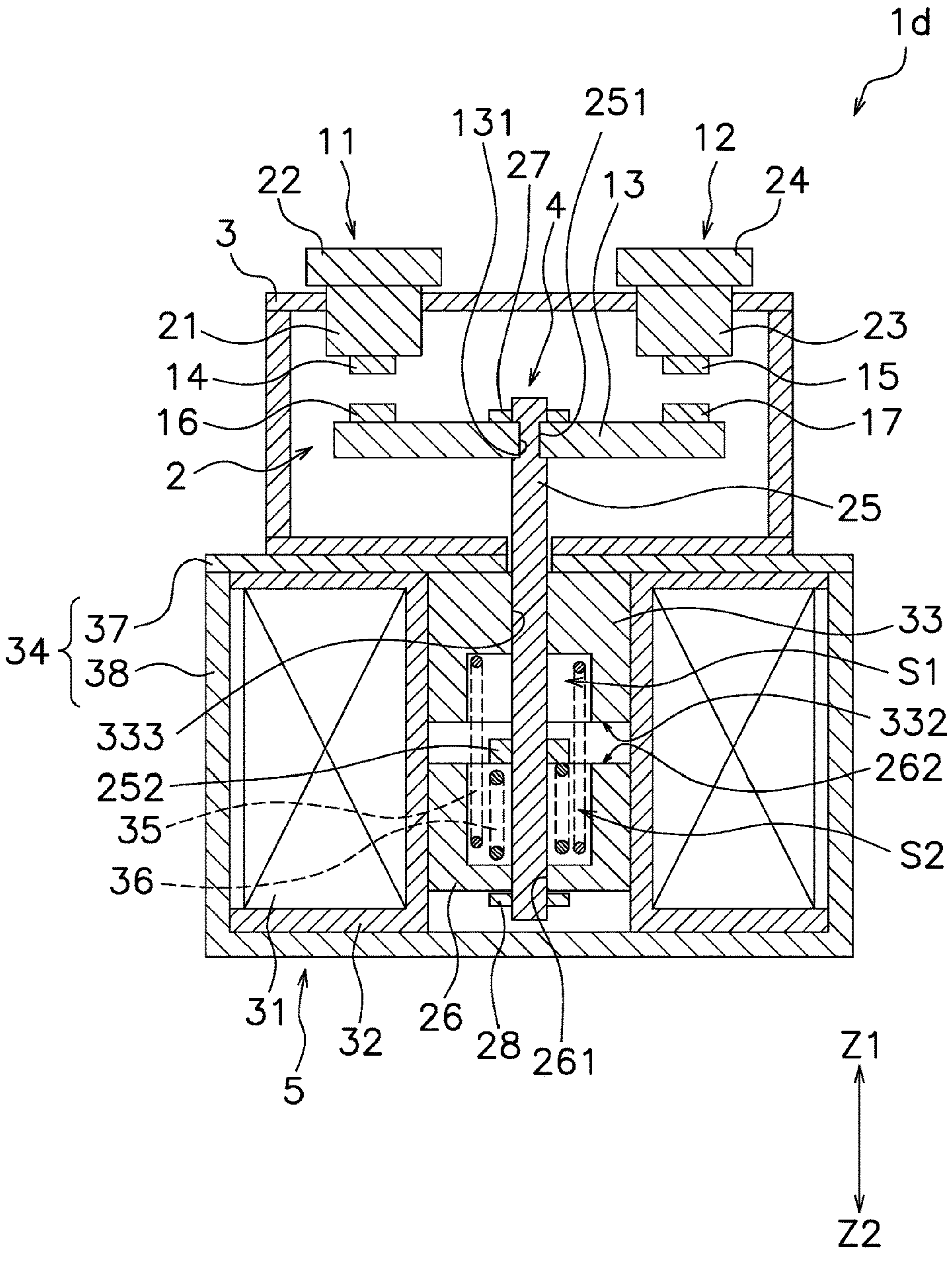
FIG. 7 is a side sectional view showing the relay according to a fourth embodiment.
Figure 8A:
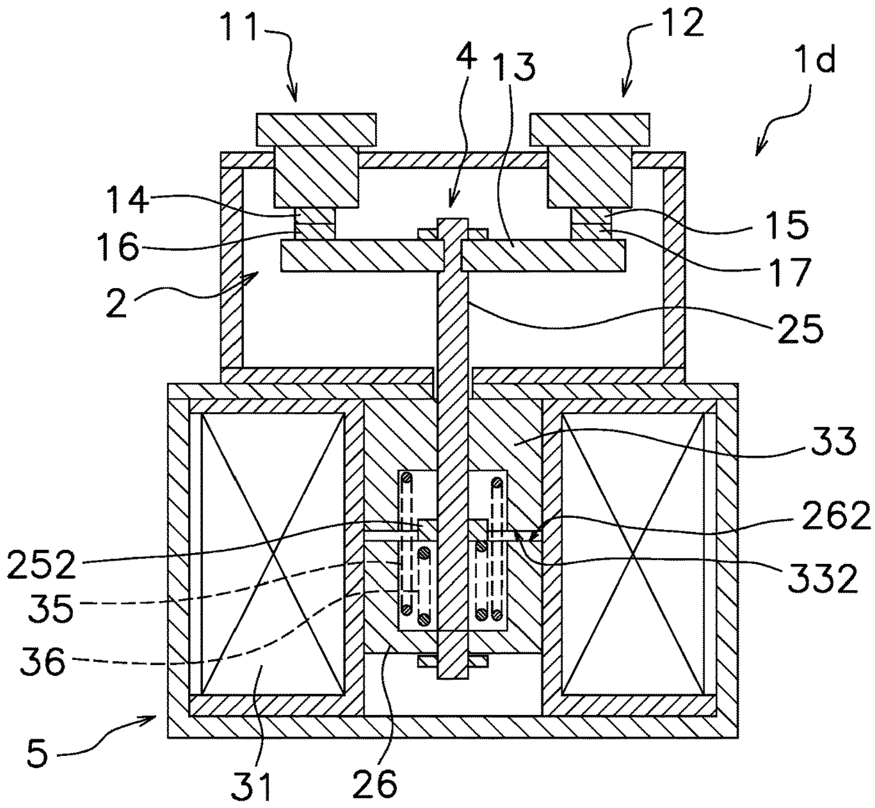
FIGS. 8A and 8B are side sectional views showing the relay according to the fourth embodiment.
Figure 8B:
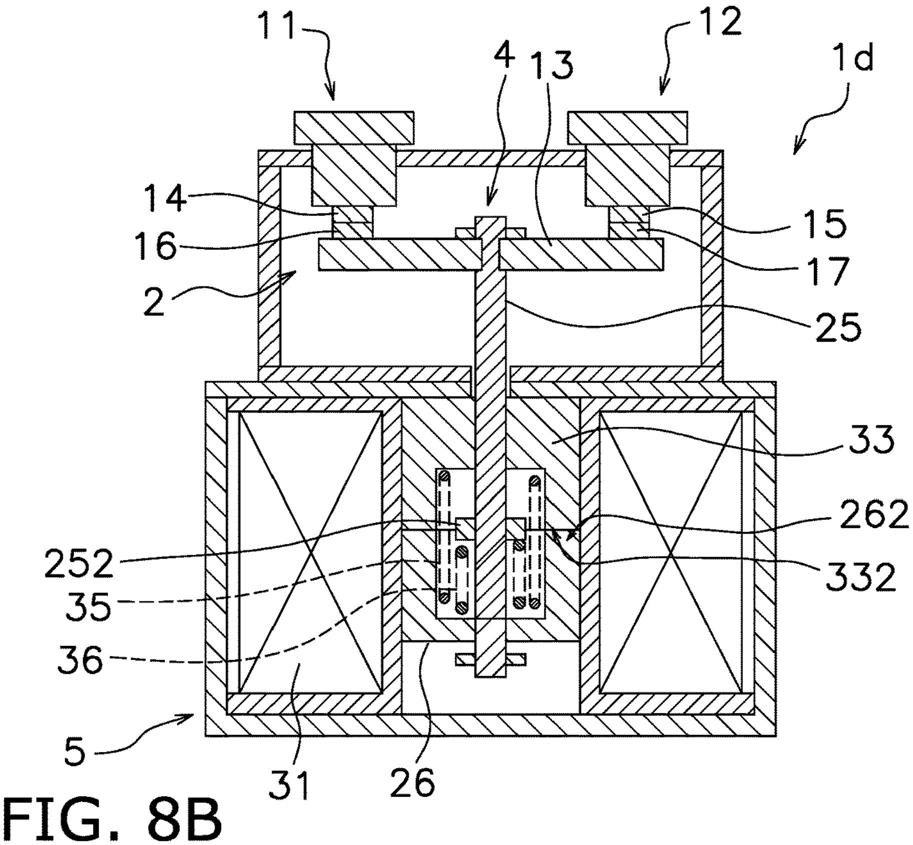

For example, FIGS. 7, 8A and 8B are side sectional views of a relay 1*d* according to a fourth embodiment. FIG. 7 shows the relay 1*d* in the open state. FIGS. 8A and 8B show the relay 1*d* in the closed state. As illustrated in FIGS. 7 and 8, in the relay 1*d* according to the fourth embodiment, the movable contact piece 13 is arranged below the first fixed contact 14 and the second fixed contact 15. In FIGS. 7 and 8, the first external terminal portion 22 and the second external terminal portion 24 project upward from the contact case 3. However, the first external terminal portion 22 and the second external terminal portion 24 may protrude from the contact case 3 in other directions.

The fixed iron core 33 includes a hole 333 that extends through the fixed iron core in the vertical direction. The drive shaft 25 is inserted into the hole 333. The fixed iron core 33 includes the first internal space S1. The first internal space S1 is open on the lower surface 332 of the fixed iron core 33. The first internal space S1 extends upward from the lower surface 332 of the fixed iron core 33.

The movable iron core 26 is arranged below the fixed iron core 33. The movable iron core 26 includes the second internal space S2. The second internal space S2 is open on the upper surface 262 of the movable iron core 26. The second internal space S2 extends downward from the upper surface 262 of the movable iron core 26. The second internal space S2 faces the first internal space S1. The stopper 28 is arranged below the movable iron core 26.

The contact spring 36 is arranged in the second internal space S2. The spring support portion 252 of the drive shaft 25 is arranged above the contact spring 36. The upper end of the contact spring 36 is in contact with the spring support portion 252. The lower end of the contact spring 36 is in contact with the movable iron core 26 in the second internal space S2.

The return spring 35 is arranged over the first internal space S1 and the second internal space S2. The return spring 35 is in contact with the fixed iron core 33 in the first internal space S1. The return spring 35 is in contact with the movable iron core 26 in the second internal space S2. The contact spring 36 is arranged in the return spring 35.

Next, the operation of the relay 1*d* according to the fourth embodiment will be described. In the relay 1*d* according to the fourth embodiment, the contact direction Z1 is upward in FIGS. 7 and 8, and the open direction Z2 is downward in FIGS. 7 and 8. When no current is passed through the coil 31 so that the coil 31 is not magnetized, the drive shaft 25 is pressed in the open direction Z2 by the elastic force of the return spring 35 together with the movable iron core 26. Therefore, the movable contact piece 13 is also pressed in the open direction Z2, and as illustrated in FIG. 7, the first movable contact 16 and the second movable contact 17 are in the open state in which the first movable contact 16 and the second movable contact 17 are separated from the first fixed contact 14 and the second fixed contact 15.

When a current is passed through the coil 31 so that the coil 31 is magnetized, the movable iron core 26 moves in the contact direction Z1 against the elastic force of the return spring 35 due to the electromagnetic force of the coil 31. As a result, the drive shaft 25 and the movable contact piece 13 both move in the contact direction Z1, and as illustrated in FIG. 8A, the first movable contact 16 and the second movable contact 17 contact the first fixed contact 14 and the second fixed contact 15, respectively.

Due to the electromagnetic force of the coil 31, the movable iron core 26 further moves from the position illustrated in FIG. 8A in the contact direction Z1. Then, as illustrated in FIG. 8B, the movable iron core 26 is restricted from moving upward by contacting the fixed iron core 33. As a result, the first movable contact 16 and the second movable contact 17 are in the closed state in which the first movable contact 16 and the second movable contact 17 are in contact with the first fixed contact 14 and the second fixed contact 15.

In the state illustrated in FIG. 8A, since the first movable contact 16 and the second movable contact 17 are in contact with the first fixed contact 14 and the second fixed contact 15, respectively, the drive shaft 25 are restricted from moving upward. Therefore, when the movable iron core 26 further moves in the contact direction Z1 due to the electromagnetic force of the coil 31, the movable iron core 26 moves in the contact direction Z1 with respect to the drive shaft 25. As a result, the contact spring 36 is compressed between the movable iron core 26 and the spring support portion 252. Therefore, in the closed state illustrated in FIG. 8B, the contact spring 36 urges the drive shaft 25 in the contact direction Z1. As a result, sufficient contact force is ensured.

When the current to the coil 31 is stopped so that the coil 31 is demagnetized, the movable iron core 26 is pressed in the open direction Z2 by the elastic force of the return spring 35. As a result, the movable iron core 26 moves in the open direction Z2 with respect to the drive shaft 25. When the movable iron core 26 moves to a position where the movable iron core 26 contacts the stopper 28, the movement of the movable iron core 26 with respect to the drive shaft 25 in the open direction Z2 is restricted by the stopper 28. Therefore, the drive shaft 25 moves in the open direction Z2 together with the movable iron core 26, and the movable contact piece 13 also moves in the open direction Z2. As a result, the first movable contact 16 and the second movable contact 17 return to the open state.

Other configurations of the relay 1*d* according to the fourth embodiment are the same as those of the relay 1*a* according to the first embodiment. The relay 1*d* according to the fourth embodiment can also obtain the same effects as the relay 1*a* according to the first embodiment.

Figure 9:
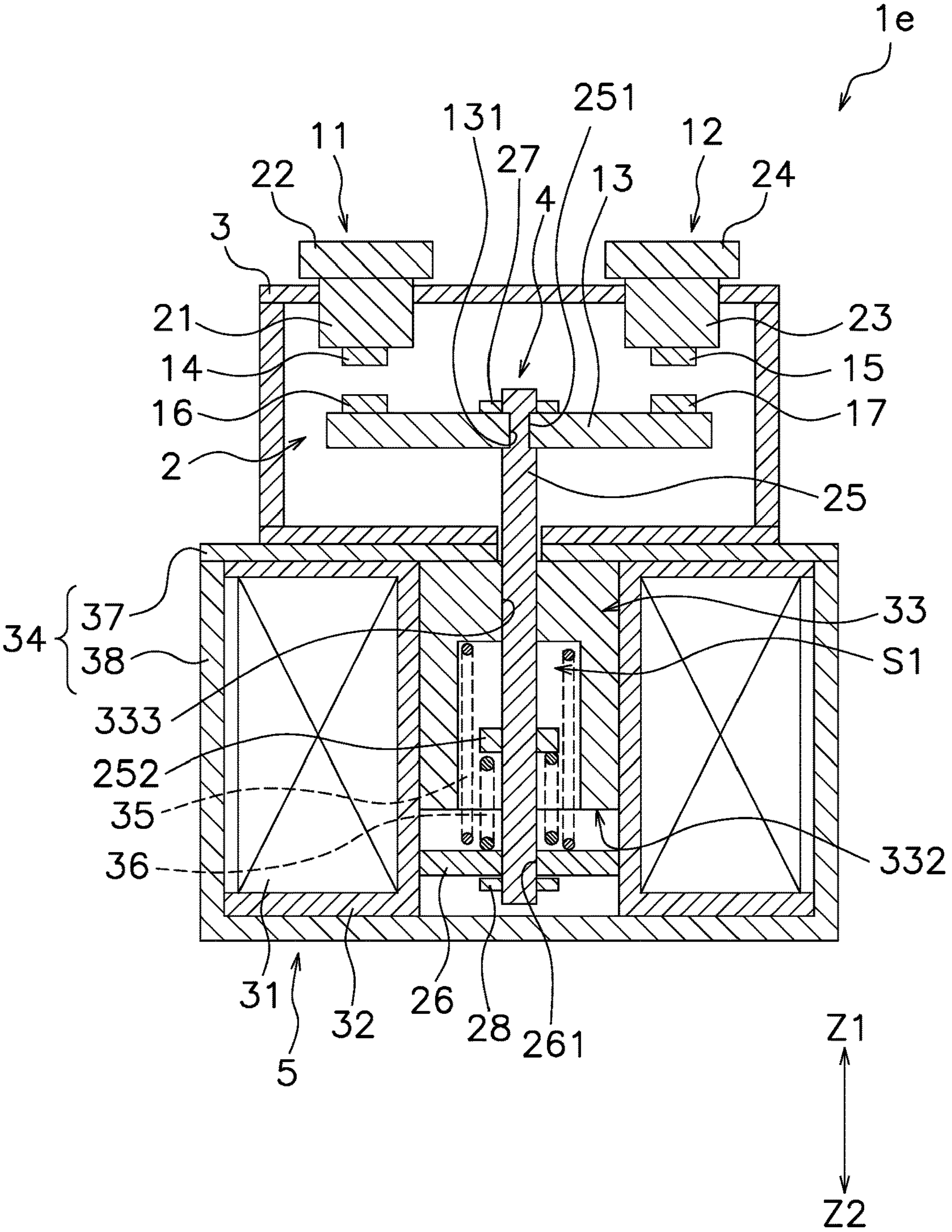
FIG. 9 is a side sectional view showing the relay according to a fifth embodiment.
Figure 10:
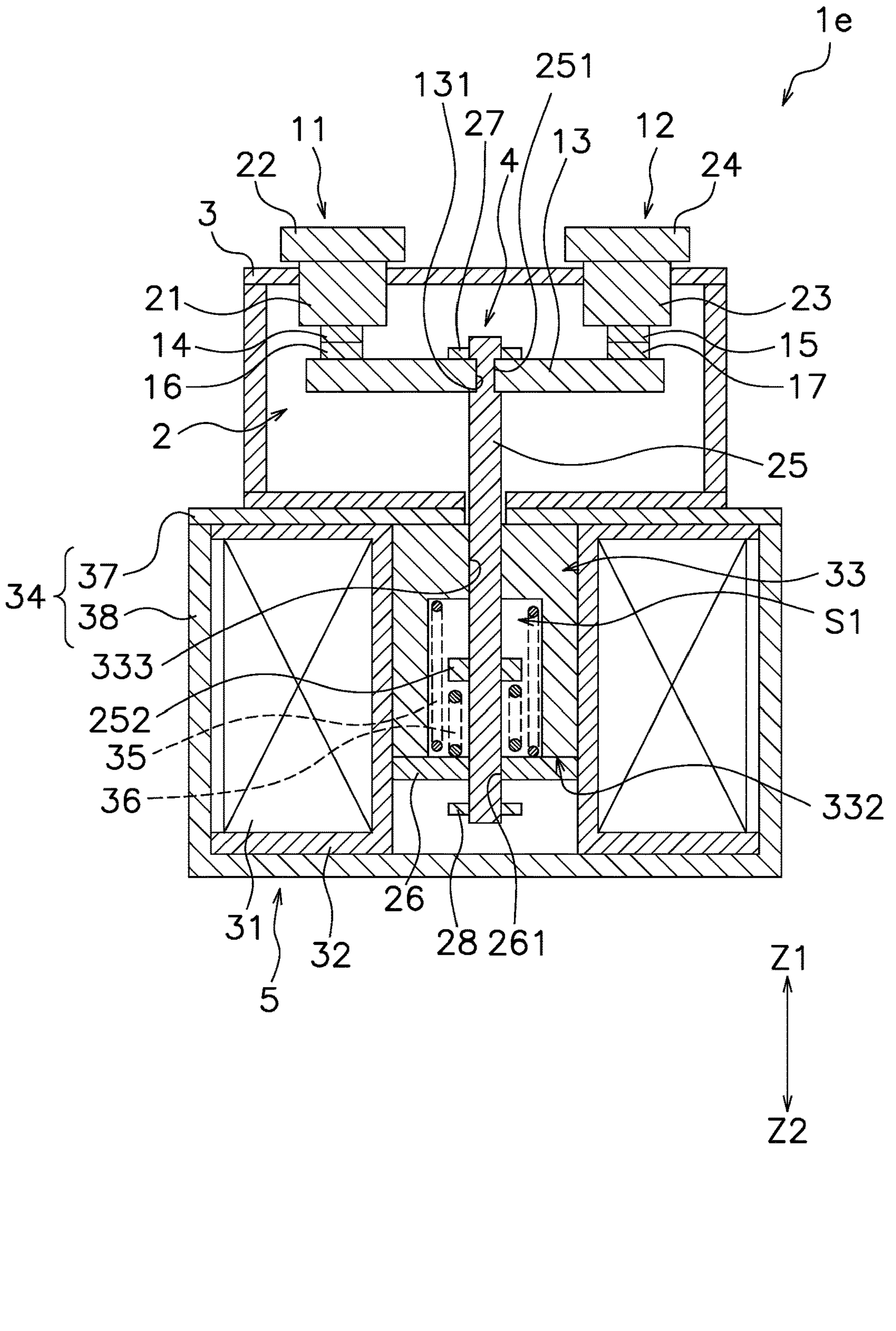
FIG. 10 is a side sectional view showing the relay according to the fifth embodiment.

FIGS. 9 and 10 are side sectional views of a relay 1*e* according to a fifth embodiment. FIG. 9 shows the relay 1*e* in the open state. FIG. 10 shows the relay 1*e* in the closed state. As illustrated in FIGS. 9 and 10, the relay 1*e* according to the fifth embodiment has the push-type structure similar to the relay 1*d* according to the fourth embodiment. Further, in the relay 1*e* according to the fifth embodiment, both the contact spring 36 and the return spring 35 are arranged in the internal space S1 of the fixed iron core 33. In this case, the internal space S2 of the movable iron core 26 may be omitted. Other configurations of the relay 1*e* according to the fifth embodiment are the same as those of the relay 1*d* according to the fourth embodiment. The relay 1*e* according to the fifth embodiment can also obtain the same effects as the relay 1*a* according to the first embodiment.

Figure 11:
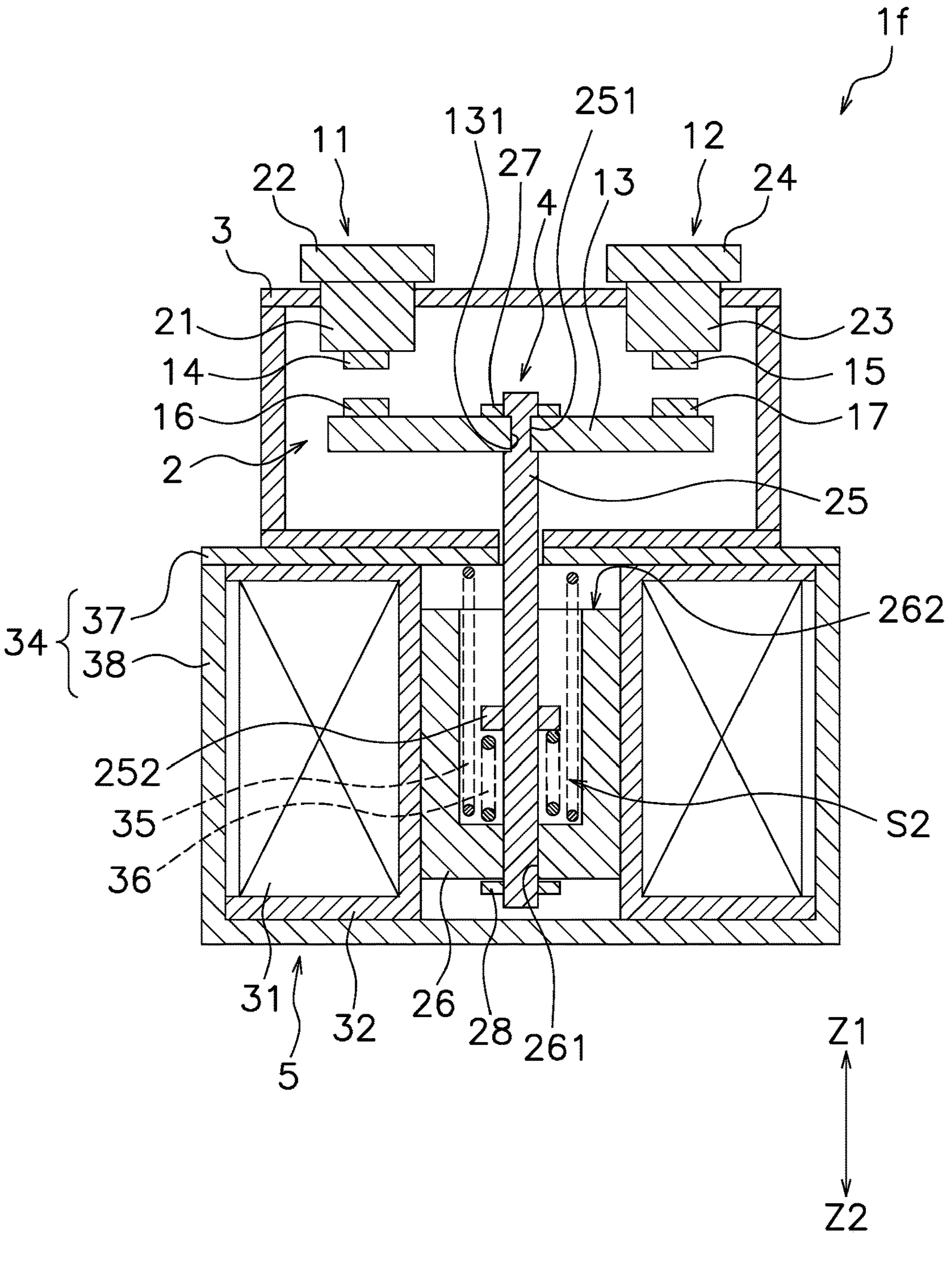
FIG. 11 is a side sectional view showing the relay according to a sixth embodiment.
Figure 12:
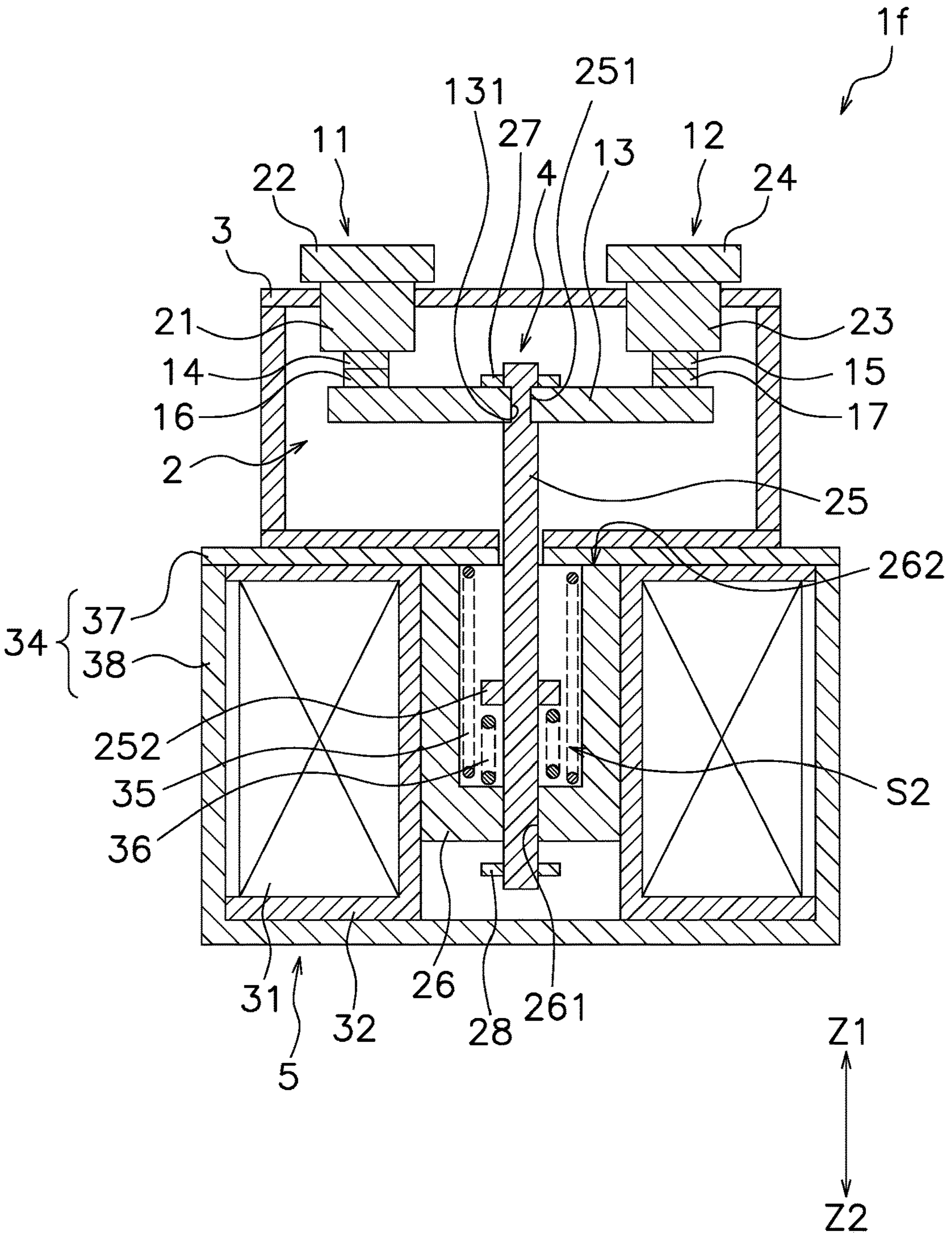
FIG. 12 is a side sectional view showing the relay according to the sixth embodiment.

FIGS. 11 and 12 are side sectional views of a relay 1*f* according to a sixth embodiment. FIG. 11 shows the relay 1*f* in the open state. FIG. 12 shows the relay 1*f* in the closed state. As illustrated in FIGS. 11 and 12, the relay 1*f* according to the sixth embodiment has the push-type structure similar to the relay 1*d* according to the fourth embodiment. Further, in the relay 1*f* according to the sixth embodiment, both the contact spring 36 and the return spring 35 are arranged in the internal space S2 of the movable iron core 26. In this case, the fixed iron core 33 may be omitted. Alternatively, the fixed iron core 33 may be provided, and the internal space S1 of the fixed iron core 33 may be omitted.

Other configurations of the relay 1*f* according to the sixth embodiment are the same as those of the relay 1*d* according to the fourth embodiment. The relay 1*f* according to the sixth embodiment can also obtain the same effects as the relay 1*a* according to the first embodiment.

Although the embodiments of the present invention have been described above, the present invention is not limited to the above embodiments, and various modifications can be made without departing from the gist of the invention. For example, the configuration of the coil block 5 may be changed. The shape or arrangement of the coil 31, spool 32, or yoke 34 may be changed. The shape or arrangement of the contact case 3 may be changed.

The shapes or arrangements of the first fixed terminal 11, the second fixed terminal 12, and the movable contact piece 13 may be changed. The first fixed contact 14 may be provided separately from the first fixed terminal 11 or may be integrated with the first fixed terminal 11. The second fixed contact 15 may be provided separately from or integrated with the second fixed terminal 12. The first movable contact 16 may be provided separately from the movable contact piece 13, or may be integrated with the movable contact piece 13. The second movable contact 17 may be provided separately from the movable contact piece 13, or may be integrated with the movable contact piece 13.

The shape or arrangement of the return spring 35 and/or the contact spring 36 may be changed. For example, the return spring 35 is not limited to the coil spring, and may be another type of spring such as a plate spring. The contact spring 36 is not limited to the coil spring, and may be another type of spring such as a plate spring. In the above embodiment, the return spring 35 urges the movable portion 4 by contacting the movable iron core 26. However, the return spring 35 may urge the movable portion 4 by contacting the drive shaft 25.

The shape or arrangement of the fixed iron core 33 and/or the movable iron core 26 may be changed. In the above-described embodiment, for example, the drive shaft 25, the movable iron core 26, and the fixed iron core 33 each have a circular shape in a cross section perpendicular to the axial direction of the drive shaft 25. However, the drive shaft 25, the movable iron core 26, and the fixed iron core 33 may have a polygonal shape as well as a circular shape in a cross section perpendicular to the axial direction of the drive shaft 25.

Figure 13:
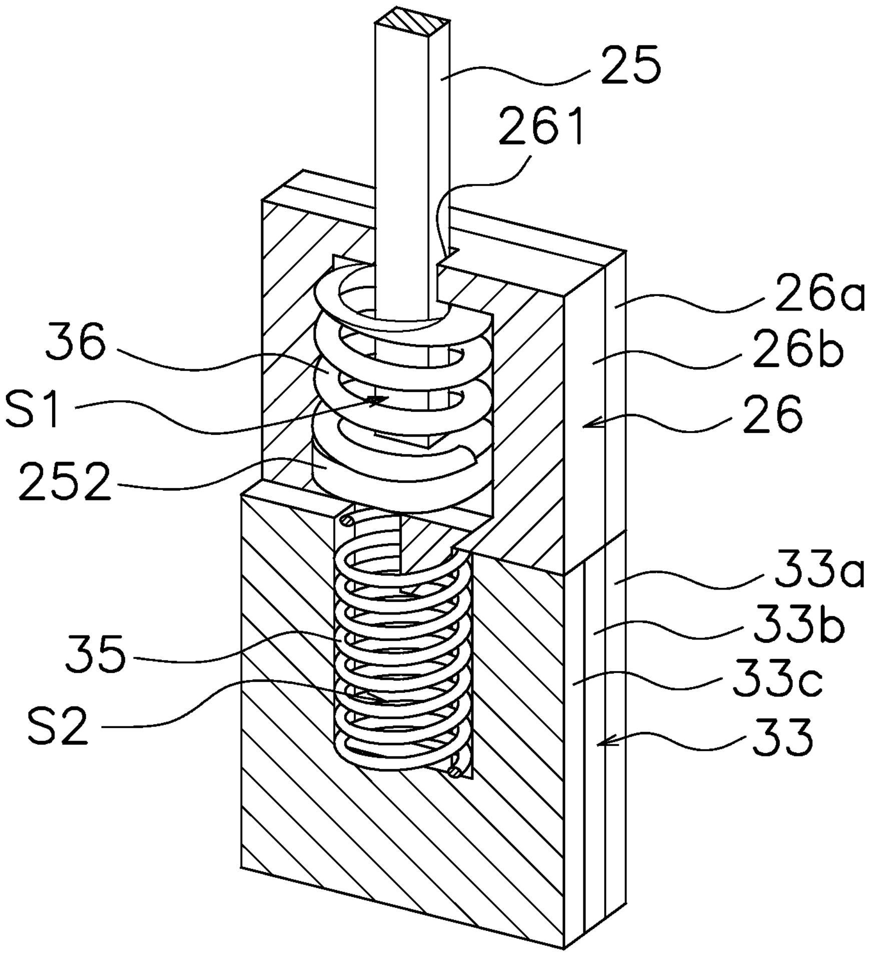
FIG. 13 is a perspective view showing a drive shaft, a movable iron core, and a fixed iron core according to a modified example.

For example, FIG. 13 is a perspective view showing a drive shaft 25, a movable iron core 26, and a fixed iron core 33 according to a modified example. As illustrated in FIG. 13, the drive shaft 25, the movable iron core 26, and the fixed iron core 33 may have a quadrangular shape in a cross section perpendicular to the axial direction of the drive shaft 25. The movable iron core 26 includes a hole 261 into which the drive shaft 25 is inserted. The hole 261 may have a quadrangular shape corresponding to the cross-sectional shape of the drive shaft 25.

In this case, the drive shaft 25 is locked to the edge of the hole 261 of the movable iron core 26, so that the rotation of the drive shaft 25 around the axis is restricted. Therefore, the drive shaft 25 is stopped from rotating with respect to the movable iron core 26. As a result, the rotation of the movable contact piece 13 is prevented. Further, by sliding the drive shaft 25 and the hole 261 of the movable iron core 26, even if abrasion powder is generated, it is possible to prevent the abrasion powder from adhering to the movable contacts 16 and 17 or the fixed contacts 14 and 15. As a result, it is possible to suppress an increase in contact resistance due to abrasion powder.

As illustrated in FIG. 13, the movable iron core 26 may be a stack of a plurality of plate-shaped iron cores 26*a* and 26*b*. The fixed iron core 33 may be a stack of a plurality of plate-shaped iron cores 33*a* to 33*c*. Further, although not illustrated, the hole 321 of the spool 32 in which the movable iron core 26 is arranged may also have a polygonal shape. In that case, the movable iron core 26 is stopped from rotating with respect to the spool 32. Thereby, the rotation of the movable contact piece 13 can be prevented.

REFERENCE NUMERALS

3: Contact case, 4: Moving portion, 13: Movable contact piece, 14: First fixed contact, 16: First movable contact, 25: Drive shaft, 26: Movable iron core, 28: Stopper, 31: Coil, 32: Spool, 33: Fixed iron core, 35: Return spring, 36: Contact spring, 261: Hole of Movable iron core, S1: Interior space of Fixed iron core (First interior space), S2: Internal space of Movable iron core (Second internal space)

The invention claimed is:

1. A relay, comprising:

a fixed contact;

a movable contact piece including a movable contact arranged to face the fixed contact;

a contact case configured to accommodate the fixed contact and the movable contact piece;

a movable portion configured to move in a moving direction including a contact direction in which the movable contact contacts the fixed contact and an open direction in which the movable contact is separated from the fixed contact, the movable portion including a drive shaft and a movable iron core that moves in the moving direction relative to the drive shaft, the drive shaft fixed to the movable contact piece in the contact case, the drive shaft extending from an inside of the contact case to an outside of the contact case, the movable iron core movably connected to the drive shaft and being located outside the contact case;

a coil configured to generate a magnetic force that moves the movable iron core in the moving direction of the movable portion;

a return spring configured to urge the movable portion in the open direction; and a contact spring configured to urge the drive shaft in the contact direction, the contact spring being arranged completely outside the contact case in both 1) a state in which the movable contact contacts the fixed contact and 2) a state in which the movable contact is separated from the fixed contact.

2. The relay according to claim 1, wherein the drive shaft is immovably fixed to the movable contact piece so as not to move in the contact case in an axial direction of the drive shaft.

3. The relay according to claim 1, further comprising:

a spool around which the coil is wound, the spool being arranged outside the contact case, wherein the spool includes a hole extending in the moving direction of the movable portion, and the contact spring is arranged in the hole of the spool.

4. The relay according to claim 1, further comprising:

a fixed iron core that faces the movable iron core, wherein the fixed iron core includes a first internal space extending in the moving direction of the movable portion, and the contact spring is arranged in the first internal space of the fixed iron core.

5. The relay according to claim 4, wherein both the contact spring and the return spring are arranged in the first internal space of the fixed iron core.

6. The relay according to claim 4, wherein the contact spring is arranged in the first internal space of the fixed iron core, and the return spring is arranged radially outward of the fixed iron core.

7. The relay according to claim 1, wherein the movable iron core includes a second internal space extending in the moving direction of the movable portion, a part of the drive shaft is arranged in the second internal space of the movable iron core, and the contact spring is arranged in the second internal space of the movable iron core.

8. The relay according to claim 7, wherein both the contact spring and the return spring are arranged in the second internal space of the movable iron core.

9. The relay according to claim 1, further comprising:

a fixed iron core that faces the movable iron core, wherein the fixed iron core includes a first internal space extending in the moving direction of the movable portion, the movable iron core includes a second internal space that extends in the moving direction of the movable portion and faces the first internal space, the contact spring is arranged in the first internal space, and the return spring is arranged over the first internal space and the second internal space.

10. The relay according to claim 1, wherein the movable iron core includes a hole extending through the movable iron core in the moving direction of the movable portion, and the drive shaft is inserted into the hole of the movable iron core and is configured to move in the moving direction of the movable portion with respect to the movable iron core.

11. The relay according to claim 10, further comprising:

a stopper configured to restrict the movable iron core from moving with respect to the drive shaft in a case in which the movable portion moves in the open direction, wherein the stopper is arranged outside the contact case.

12. The relay according to claim 10, wherein the drive shaft and the hole of the movable iron core have a polygonal shape.

* * * * *